United States Patent [19]

Eriksson

[11] Patent Number: 5,227,706
[45] Date of Patent: Jul. 13, 1993

[54] FUNCTION CONTROL DEVICE FOR MACHINES

[75] Inventor: Joakim Eriksson, Borås, Sweden
[73] Assignee: A C G Nyström, Sweden
[21] Appl. No.: 678,957
[22] PCT Filed: Oct. 19, 1989
[86] PCT No.: PCT/SE89/00576
 § 371 Date: Apr. 19, 1991
 § 102(e) Date: Apr. 19, 1991
[87] PCT Pub. No.: WO90/04670
 PCT Pub. Date: May 3, 1990

[30] Foreign Application Priority Data

Oct. 20, 1988 [SE] Sweden ............... 8803756

[51] Int. Cl.⁵ ............... F15B 15/00; D05B 69/14
[52] U.S. Cl. ............... 318/551; 318/481
[58] Field of Search ............... 318/551, 256, 257, 268, 318/481, 600, 671

[56] References Cited

U.S. PATENT DOCUMENTS

| | | |
|---|---|---|
| 3,582,748 | 2/1968 | Kato . |
| 3,597,672 | 8/1971 | Seesselberg ............... 318/257 |
| 4,100,868 | 7/1978 | Reinecke et al. . |
| 4,236,103 | 11/1980 | Matthey et al. ............... 318/442 X |
| 4,261,273 | 4/1981 | Matthey et al. . |
| 4,280,425 | 7/1981 | Croyle . |
| 4,316,130 | 2/1982 | Louarn ............... 318/551 |
| 4,413,214 | 11/1983 | Brown ............... 318/488 |
| 4,583,029 | 4/1986 | Robertson, Jr. et al. ............... 318/481 |
| 4,722,288 | 2/1988 | Nomura et al. . |
| 4,969,756 | 11/1990 | Villec et al. ............... 388/815 |

FOREIGN PATENT DOCUMENTS

606578 4/1976 France .

*Primary Examiner*—Bentsu Ro
*Attorney, Agent, or Firm*—Davis, Bujold & Streck

[57] ABSTRACT

A functional control device (1), designed to be used in primarily textile machines (20), in which the speed must be varied in a simple fashion. Its function involves a conversion of a pressure of a gaseous or liquid medium to a code, which is adapted to the machine. When speed control means, having plates (2, 3), designed to be depressed, e.g. in a sewing machines (20), are used, one of the pedals corresponds to a forward depressing movement and the other a backward depressing movement. When a nozzle (4) is used, said functions can also be provided. The so-called forward depressing movement comprises a presser foot downwards and 12 speed steps, from zero to a maximum rotational speed, which can be as high as 400-9,000 rev./min. A backward depressing movement comprises a presser foot as well as a cutting-/locking function. The function of the pressure error interface can be varied in a simple way, for various types of machine control means, and for varying pressure sensitivities. The output signals can be changed in a simple manner.

20 Claims, 13 Drawing Sheets fig.1 fig. 2a fig. 2b fig.3 fig.4 fig. 7a fig. 8a fig. 8b fig. 8c fig. 9a fig. 9b  fig. 9c fig. 10a fig. 10b

FUNCTION CONTROL DEVICE FOR MACHINES

BACKGROUND OF THE INVENTION

The present invention relates to a functional control device of the type set forth in the preamble of patent claim 1.

U.S. Pat. No. 4,261,273 relates to a pneumatic speed control device, designed for a sewing machine. This control device is actuated by means of a pneumatic breaker, which successively closes a plurality of contacts concurrently with an air pressure increase before the breaker, without any spark formation at the contacts. This control device is integrated with the sewing machine and is designed to directly actuate a machine function, namely the motor speed, but merely in one direction, namely forwardly or with a speed increase. No flexibility or adjustment as to different machines or machine types can be achieved by means of this control device. It is difficult or quite impossible to perform a pressure sensitivity and zero adjustment in practice. To use a plurality of movable parts results of course in a substantial disturbance sensitivity as well as elevated production and assembly costs. The control device is not conducive to making it easier for handicaped persons, and large foot movements are required in order to perform substantial speed changes. The used sensor, which is an entirely mechanical construction, is utterly objectionable for this purpose. A direct control using a high voltage is also an inconvenience.

Also, U.S. Pat. No. 4,722,288 relates to an electric sewing machine having an integrated computer designed to program needle work designs. Also, in this case the control device is integrated and cannot be separated from the machine to be controlled. The foot pedal, described in this document, is used solely to initiate and stop respectively a programmed or preprogrammed work operation, and it is not, like the document discussed above, conducive to helping a handicaped person, and large control movements are necessary.

The purpose of the present invention is to avoid the above-mentioned drawbacks and suggest a functional control device, which can be easily and simply adapted and connected to different machines in general terms and to different motor control means in particular, and which also is conducive to assisting a handicaped person, is simple, can be quickly and inexpensively produced and assembled and takes ergonomic and production engineering requirements into consideration, e.g. so called standing sewing operations.

These objects are attained by designing a functional control device, of the type mentioned in the introduction, according to the present invention.

BRIEF DESCRIPTION OF THE DRAWINGS

Additional characterizing features and advantages of the present invention are set forth in the following description, reference being made to the accompanying drawings, which show a few preferred but not limiting embodiments, and in which.

DESCRIPTION OF THE PREFERRED EMBODIMENTS

In the drawings reference numeral 1 denotes a functional control device according to the invention in its entirety, and 2 and 3 denote foot bellows, and alternatively a suction and/or blowing nozzle 4 can be used. Hose pipes 5 and 6 connect said bellows to an interface box 7, in which a piezo-electric sensor 8 is actuated by means of pressure fluctuations in the medium in parts 2-6, which medium can be a gas or a liquid. When a suction or blowing nozzle is used, said medium is of course the ambient air. The piezo-electric sensor 8 is designed to generate an analogous output signal, which is amplified in an amplifier 9 and enters an analog/digital converter 10. The digital signal, obtained in this way, enters a memory 11, in which the digital signal is converted to a control code, which is adapted to the respective motor control means 22, 22' and can be a so called grey code, or possibly an inverted grey code, or any digital code according to what is preferred as to the programming. The code, obtained in this way, enters an output amplifier 12, which adapts the voltage level of the code to the one, which is suitable for the control work. An electric wire 13 then connects the box to an adapter 14 for the motor control means. The interface receives its electric power supply mainly from the motor control means, which suitably is run by means of a reduced voltage, e.g. 24 V. A separate connector 15 can for this purpose be connected in a wire 16, or a special wire, designed for such a power supply through adapter 14, can be connected in wire 13. The above-described configuration is shown in FIGS. 2A, 2B, 3 and 4.

Figure 5:
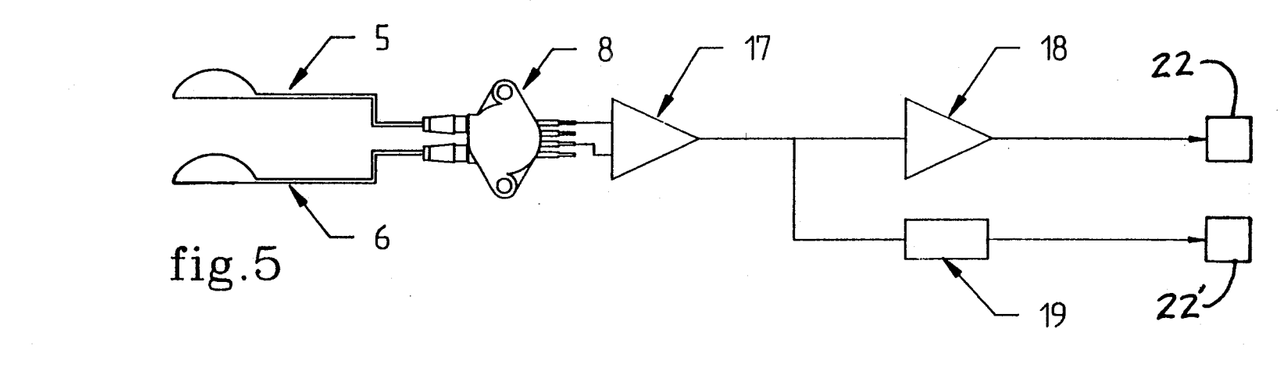
Figure 6:
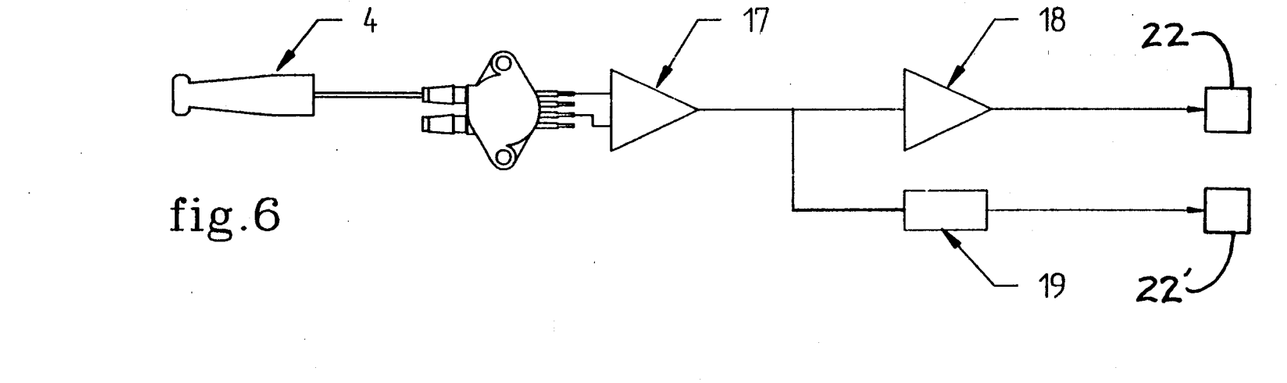

Some motor control means require an analogous control signal. Assemblies according to FIGS. 5 and 6 are designed for this purpose. According to these assemblies the signals are led from piezo-electric sensor 8 to an amplifier 17, which can have the same features as amplifier 9, described above, but which for practical reasons can be designed in a somewhat different way. See e.g. FIG. 10A and 10B. The signal subsequently is divided and led to an amplifier 18 and a simple analog/digital converter 19. Amplifier 18 adapts the analogous signal to such a signal as is required by the motor control means. Converter verter 19 is designed with additional functions, e.g. start, stop, presser foot lifting or lowering, thread cutting and starting and stopping control signals. The amplifier controls the motor speed and a connection/interrelationship between amplifier 18 and converter 19 may exist.

Figure 1:
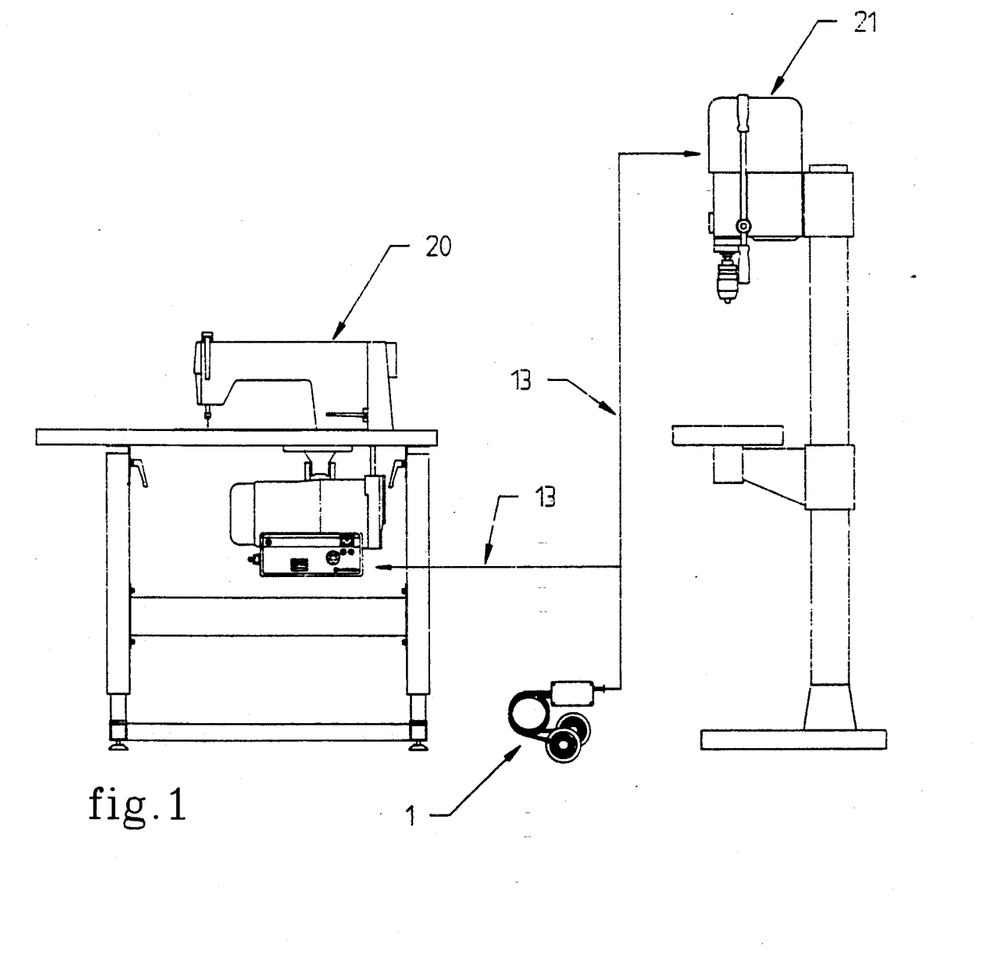
FIG. 1 shows an embodiment of a functional control device according to the invention, designed for two different machines, namely e.g. a sewing machine and a drilling machine.
Figure 2A:
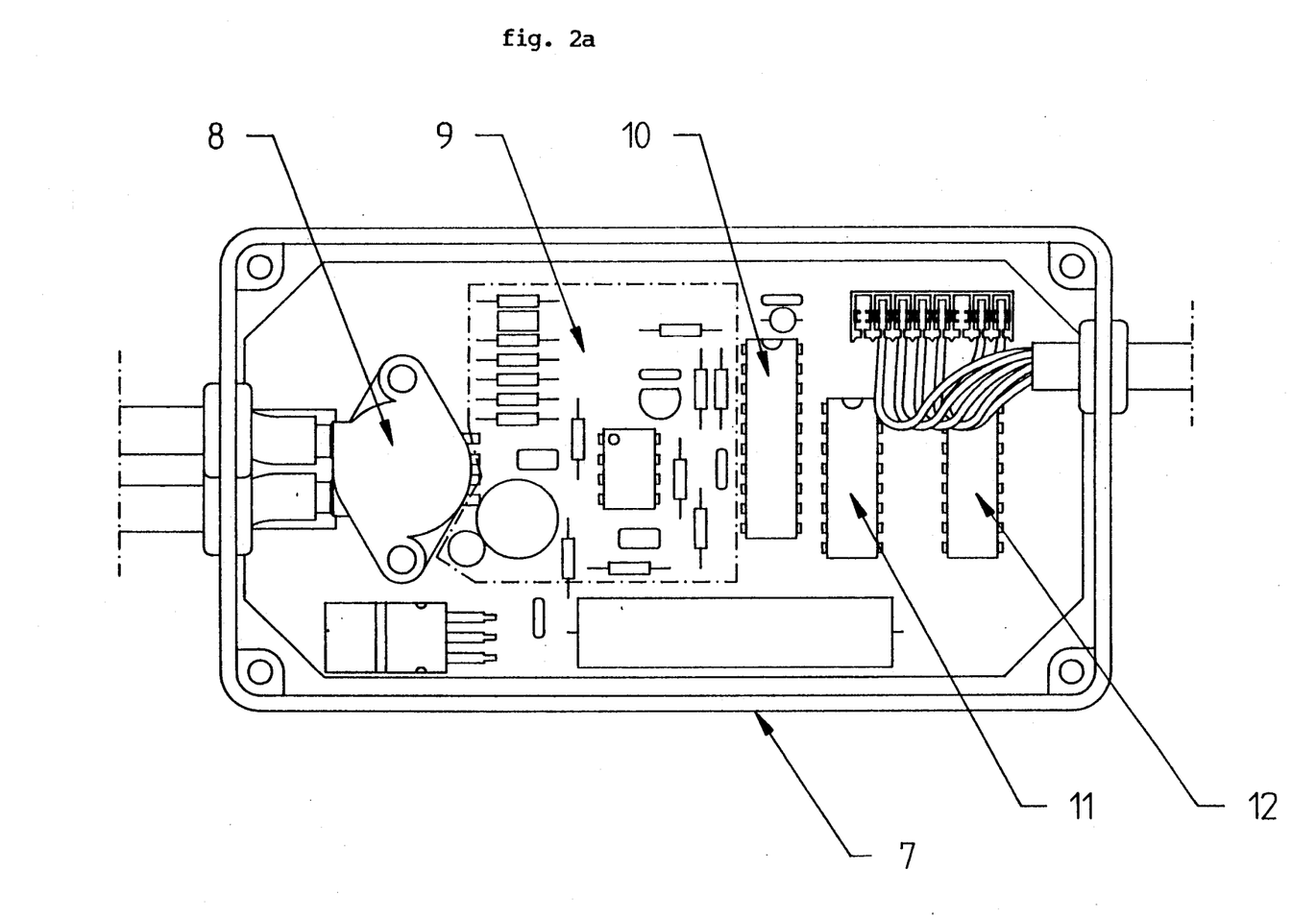
FIG. 2A is an exploded view of an interface box shown in FIG. 2B.
Figure 2B:
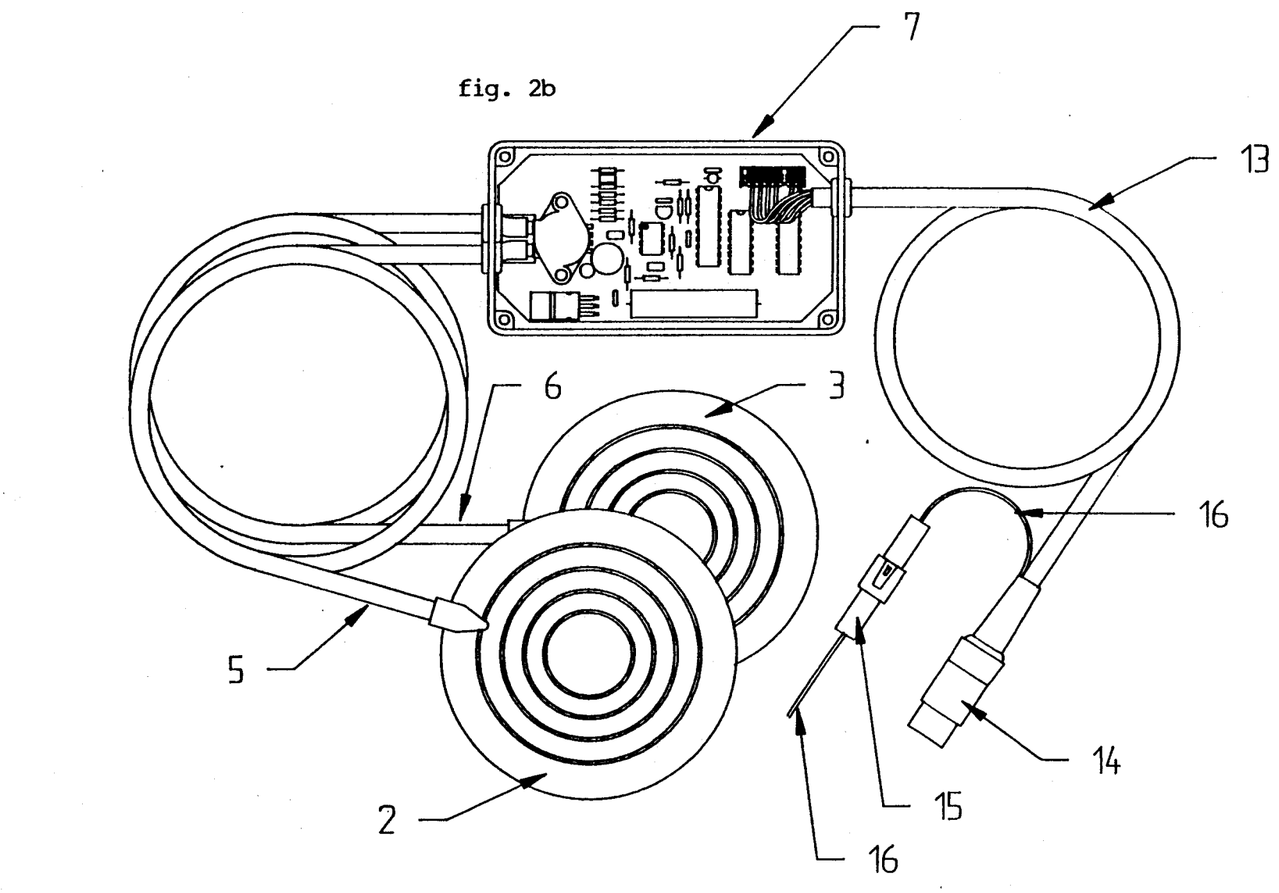
FIG. 2B shows a functional control device according to the invention.

In FIG. 1 it is illustrated that a functional control device according to the invention is easy to use for controlling e.g. a sewing machine 20 or a drilling machine 21.

In accordance with a preferred embodiment the forward depressing movement comprises a presser foot and 12 speed steps or steplessly from zero to the maximum motor speed, e.g. 400-9000 rev./min., and a presser foot and a cutting and control function respectively. The function of the pressure interface and the electric interface respectively can easily be changed in a way known per se for various types of machine control means and different pressure sensitivities. The output signals can also be changed.

Figure 4:
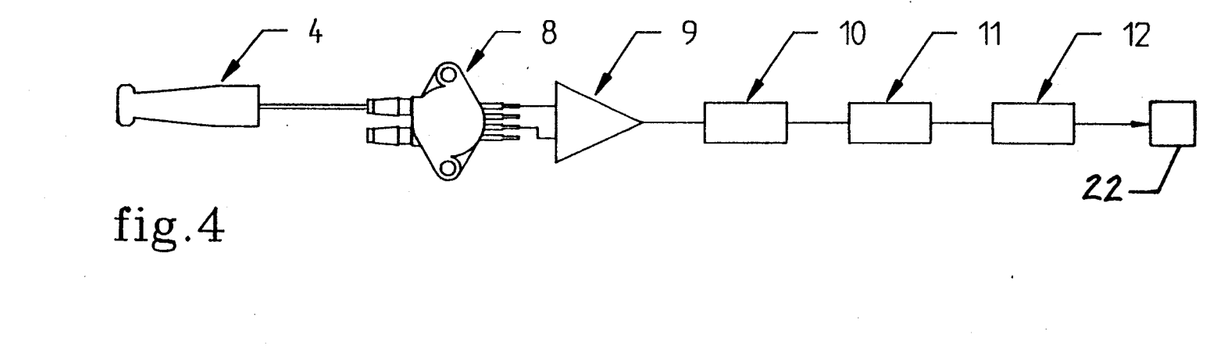

In FIGS. 4 and 6 embodiments provided with a suction nozzle 4 are shown. In case a blowing is required in order to obtain an actuation, this nozzle can be connected to the other connection joint, shown in the drawings, which normally is e.g. plugged up. As an alternative this joint is open to the ambient air.

Figure 3:
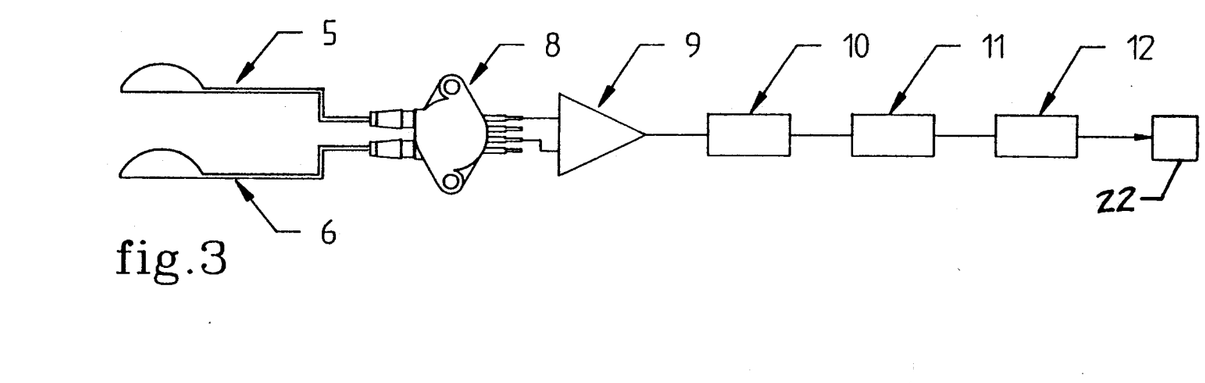
FIGS. 3-6 schematically show how various feasible functional control devices are designed according to the invention.
Figure 7A:
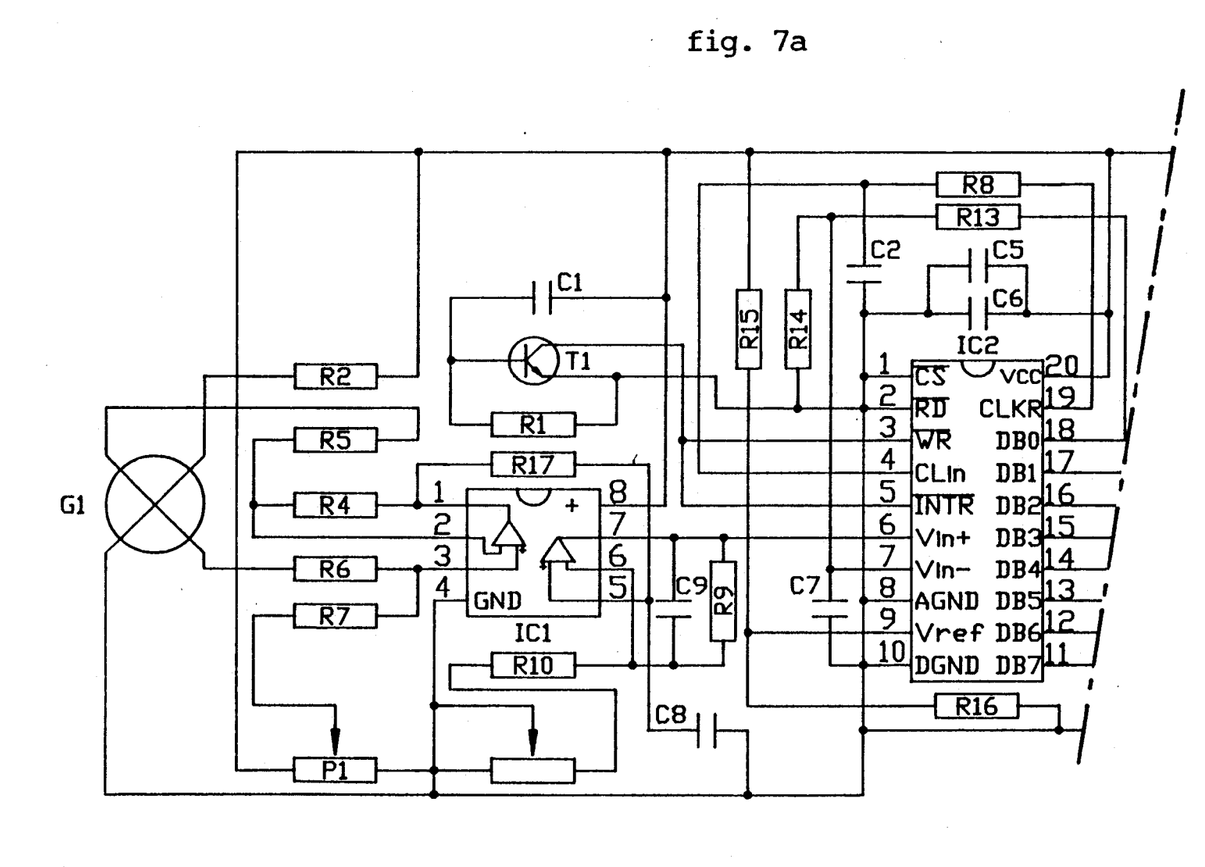
FIGS. 7A and 7B diagrammatically show left and right half portion plan views, respectively, of a circuit diagram for an assembly according to FIGS. 3 and 4.
Figures 7B, 7C:
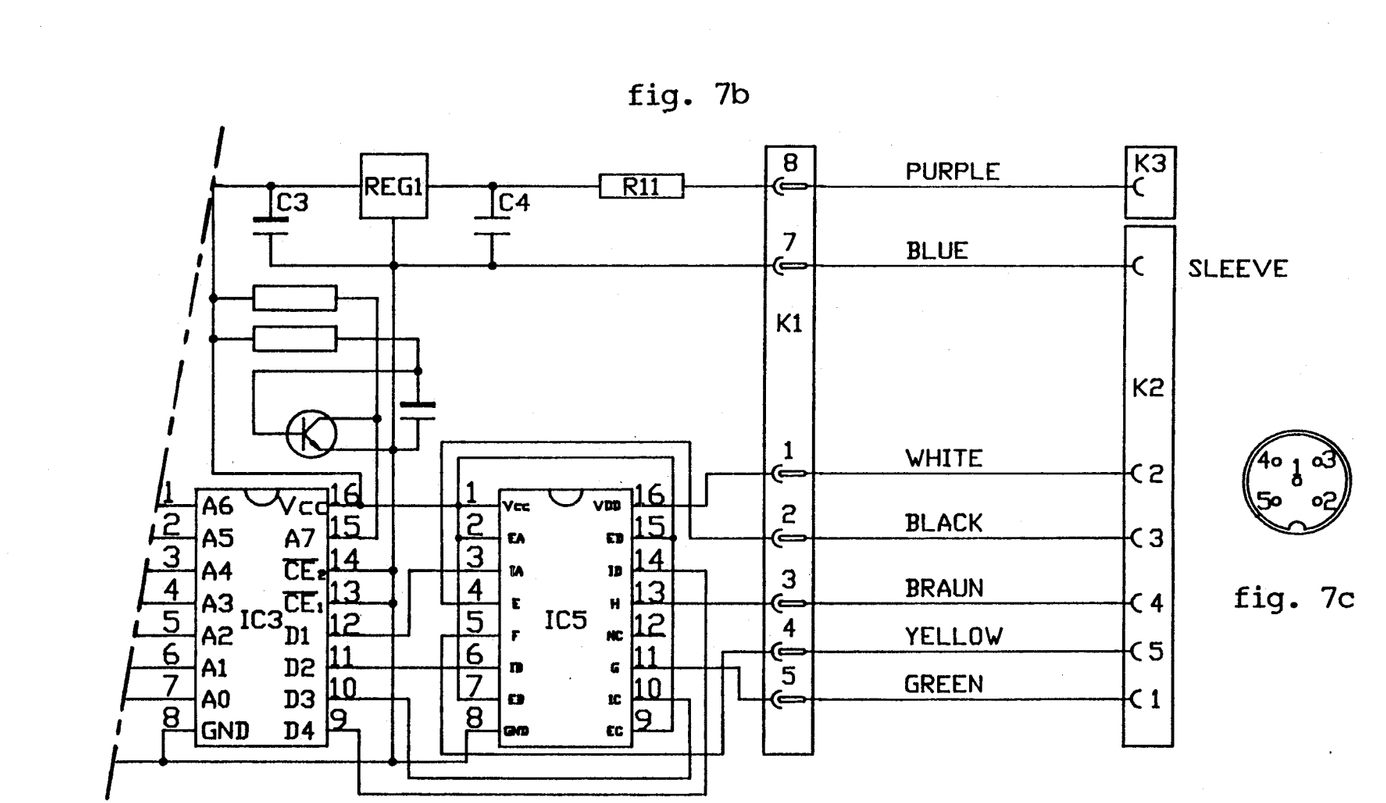
FIG. 7C shows a diagrammatic end view of a connector.
Figure 8A:
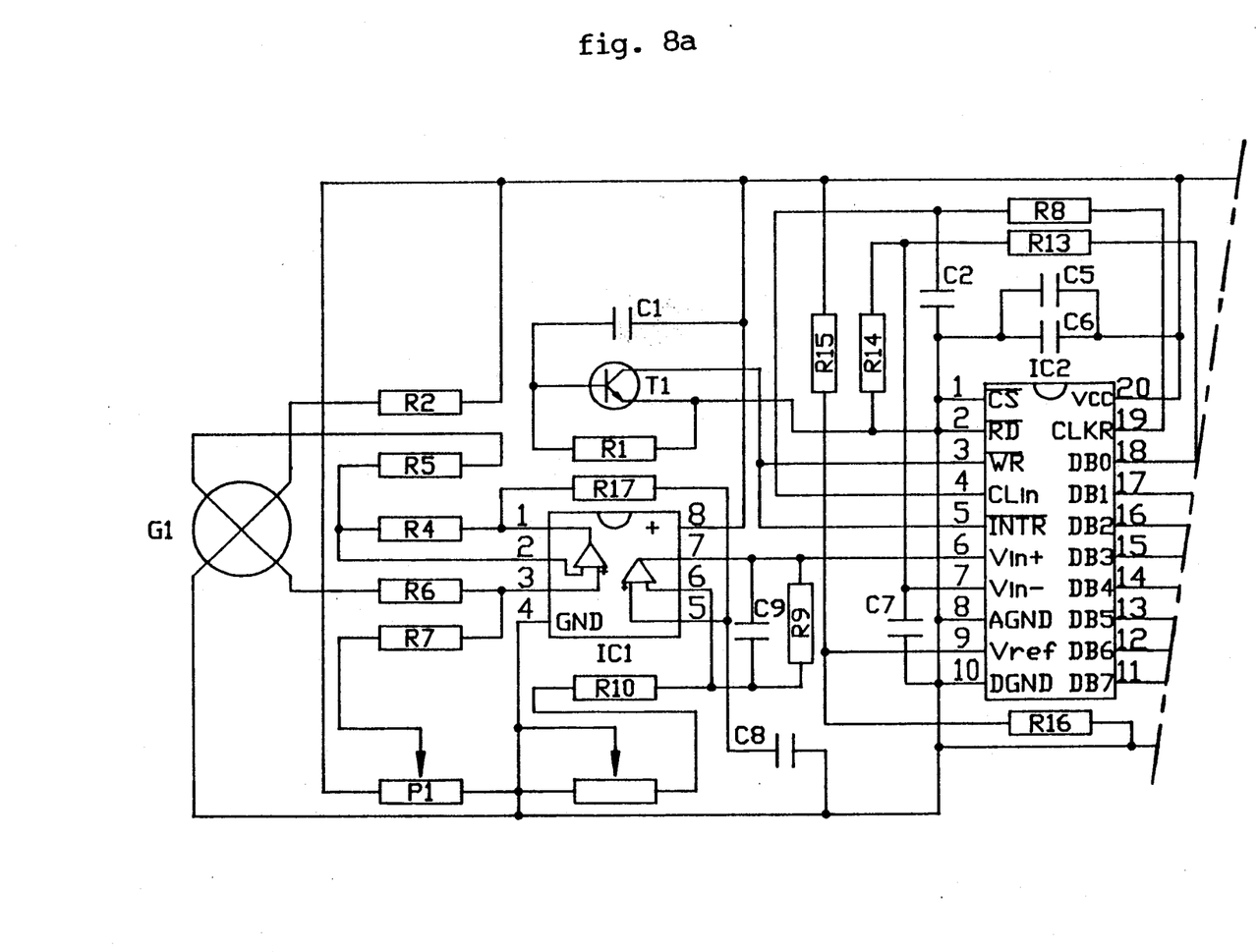
FIG. 8A and 8B diagrammatically show left and right half portion plan views, respectively, of a circuit diagram for an assembly according to FIGS. 3 and 4.
Figures 8B, 8C:
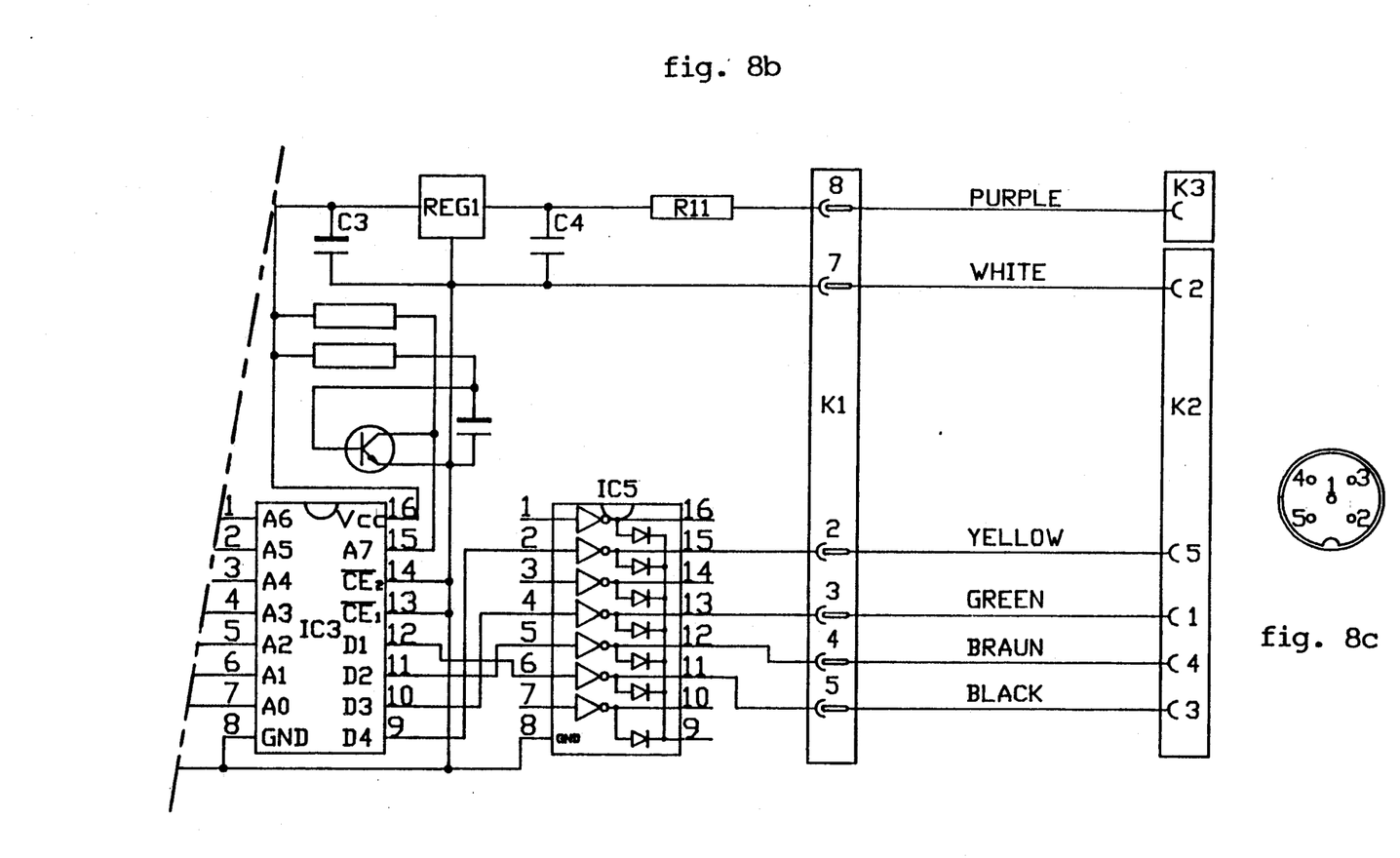
FIG. 8C shows a diagrammatic end view of a connector.
Figure 9A:
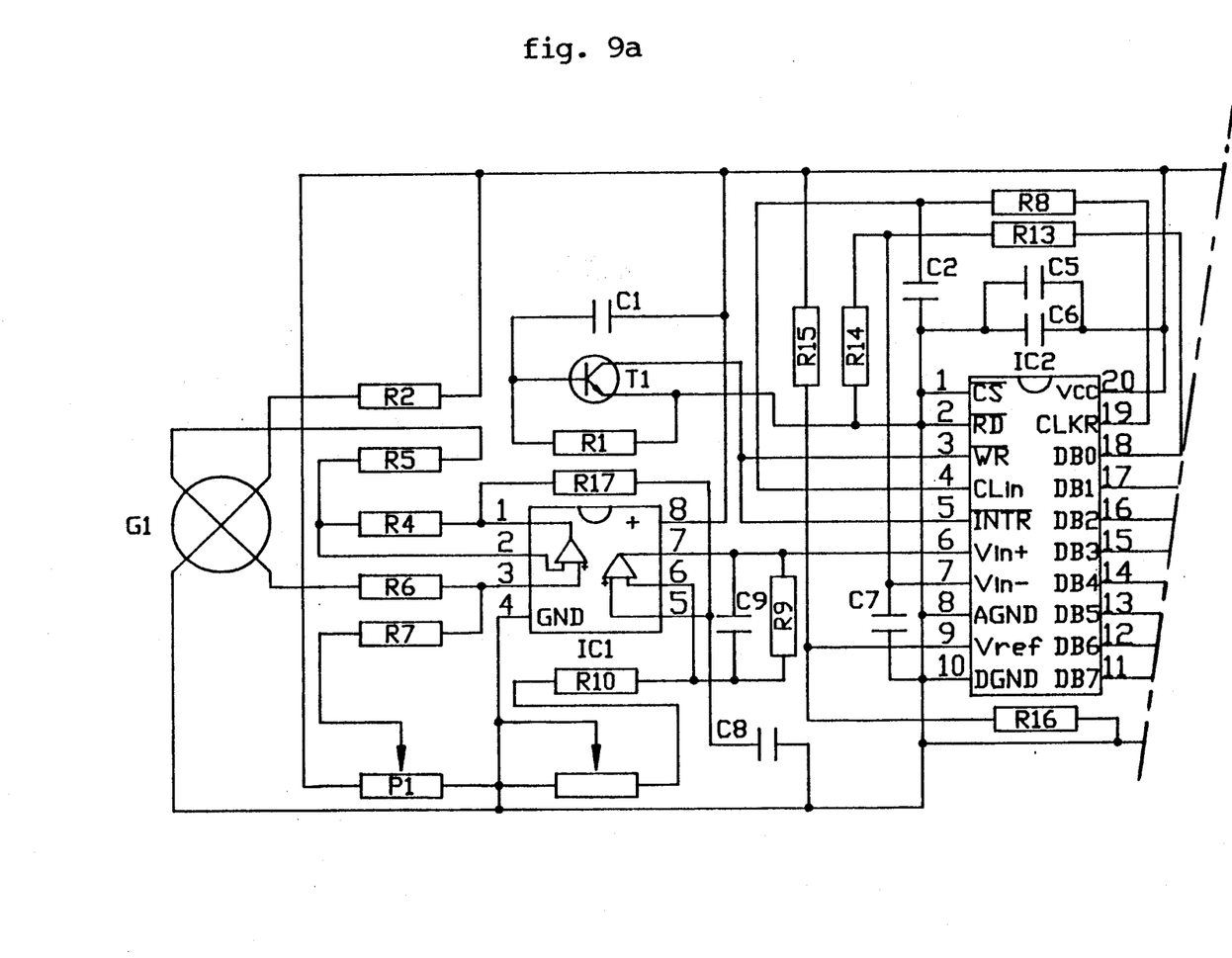
FIGS. 9A and 9B diagrammatically show left and right half portion plan views, respectively, of a circuit diagram for an assembly according to FIGS. 3 and 4.
Figure 9B:
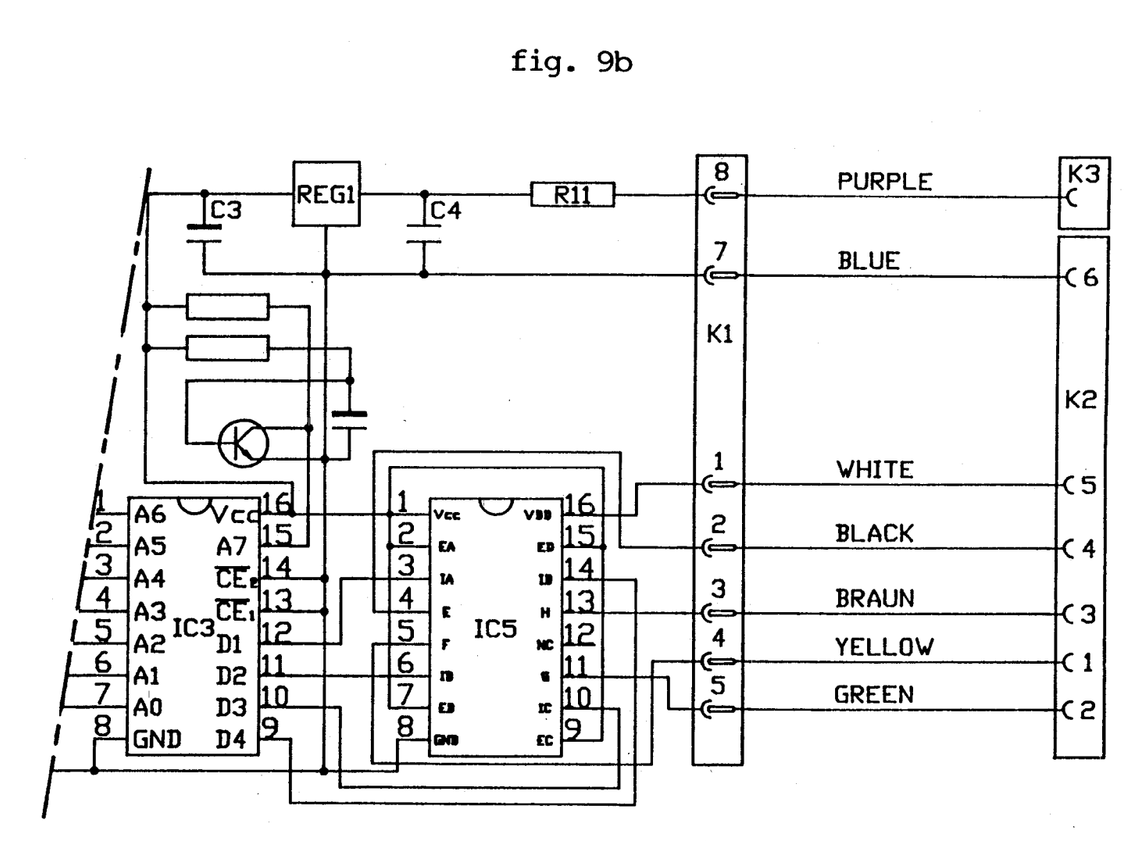
Figure 9C:
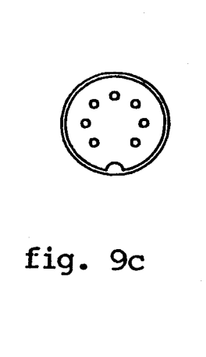
FIG. 9C shows a diagrammatic end view of a connector.
Figure 10A:
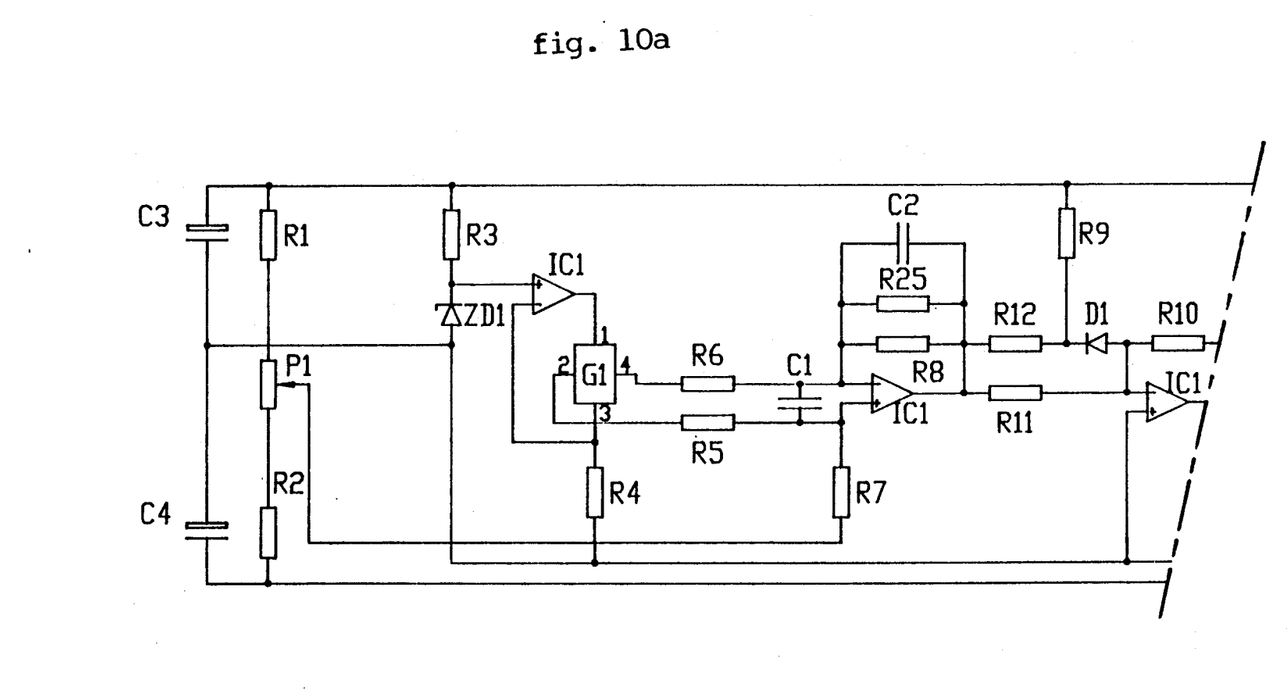
FIGS. 10A and 10B diagrammatically show left and right half portion plan views, respectively, of a circuit diagram for an assembly according to FIGS. 5 and 6.
Figure 10B:
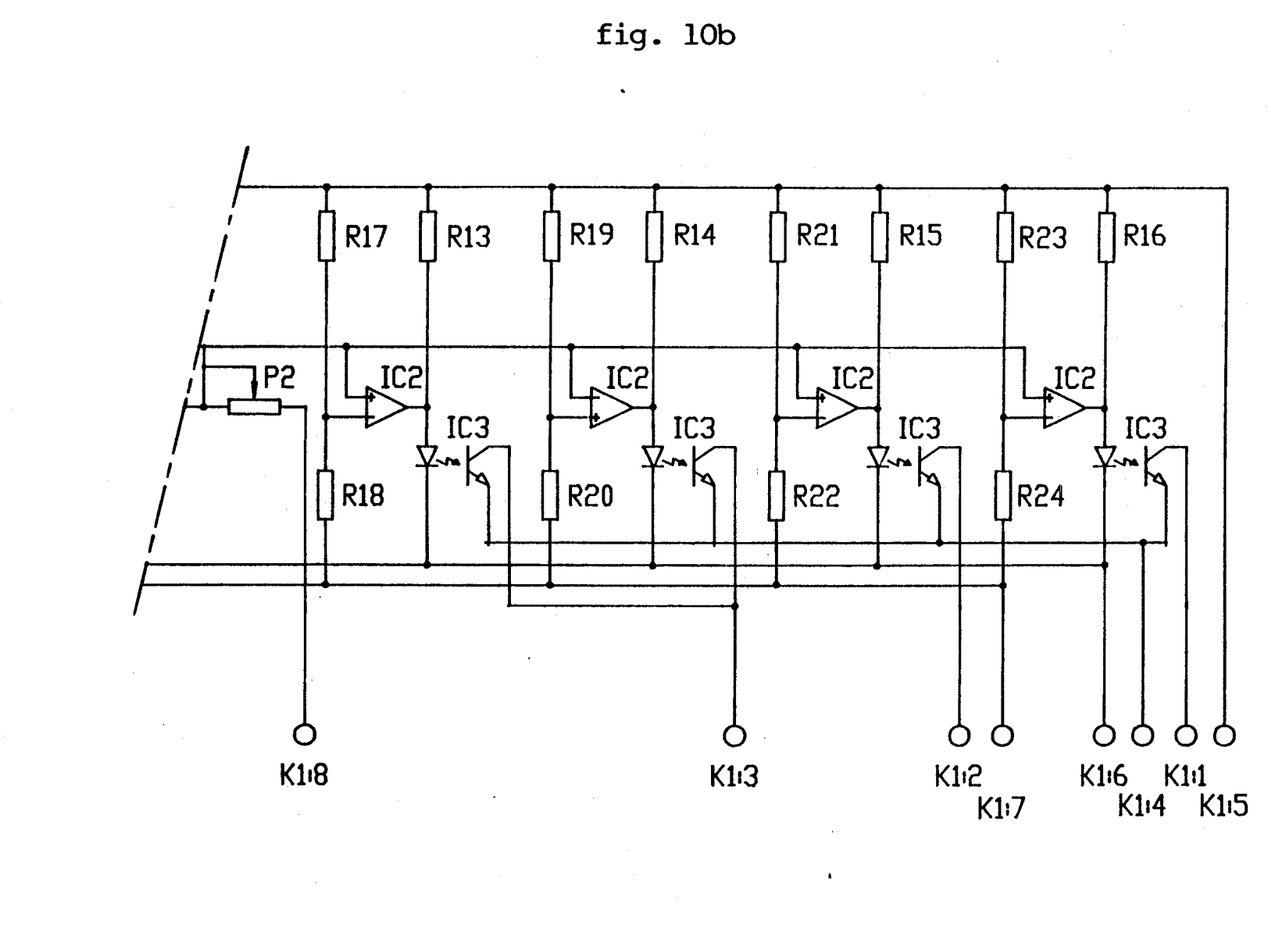

FIGS. 7 through 9 show circuit diagrams for assembly of the control device according to FIGS. 3 and 4 while FIG. 10 shows a circuit diagram for assembly of the control device according to FIGS. 5 and 6. As a person skilled in the art would be readily able to understand the circuit diagrams concerning FIGS. 7-10, further description concerning the same is not provided.

I claim:

1. A functional control device for a machine to be controlled, said control device being a remote control device and comprising first and second foot pedals (2, 3) and one of a gaseous and a liquid medium being conveyed by at least one of said first and second foot pedals to control the machine as desired,
    wherein said control device is detachably connectable to the machine and is powered by 24 V direct current, said first and second foot pedals (2, 3) are each connected to an input of an interface member (7) and wire means interconnects, via an adapter, an output of said interface member with an input of motor control means of the machine, said wire means supplies control device signals to and from said motor control means, and said first and second foot pedals (2, 3) control medium flow to said interface member (7) and causes pressure variation of the control device which is converted into a code for controlling operation of the machine, and said first pedal controls at least a first function or series of functions of the machine and said second pedal controls at least a second function or series of functions of the machine.

2. A functional control device according to claim 1 is used to control a sewing machine, wherein said first series of functions control downward movement of a presser foot as well as motor speed and said second series of functions control upward movement of said presser foot as well as a cutting and locking operation.

3. A functional control device according to claim 2, wherein said interface member comprises pressure and electric interfaces for said control device, said pressure and electric interfaces are readily changeable to facilitate control of various types of machine control means and different pressure sensitivities.

4. A functional control device according to claim 1, wherein means are provided to vary signals sent to said motor control means.

5. A functional control device according to claim 1, wherein said two foot pedals (2, 3) are two bellows which each have a hose pipe (5, 6) leading to an input of said interface member (7) and the hose pipes convey said medium to said interface member (7).

6. A functional control device according to claim 1, wherein said first and second foot pedals (2, 3) actuate a piezo-electric sensor (8) of said interface member (7) which generates an analogous output signal which is amplified by a first amplifier (9 and 17 respectively).

7. A functional control device according to claim 6, wherein said analogous output signal is fed to an analog/digital converter (10) and an output signal therefrom is fed to a memory (11) where the inputted signal is converted to a control code for controlling said motor control means, and the code is fed to an output signal amplifier (12) which varies the voltage level for said motor control means according to the code.

8. A functional control device according to claim 6, wherein said analogous output signal from said first amplifier (9 and 17) is divided into two signals and simultaneously fed to a second amplifier (18) and a converter (19), said second amplifier (18) adjusts said analogous output signal to a signal required for said motor control means for controlling motor speed and said converter (19) controls at least one of starting, stopping, presser foot lifting and lowering, and thread cutting.

9. A functional control device according to claim 1, wherein said interface member (7) receives its electric power from said motor control means which is powered by a reduced 24 V direct current.

10. A functional control device according to claim 9, wherein electric power from said motor control means is supplied to said interface member (7) through one of an electric wire (16) having a built-in connector (15) and a conductor of said wire means (13).

11. A functional control device for a machine to be controlled, said control device being a remote control device and comprising nozzle means (4) and one of a gaseous and a liquid medium being conveyed via said nozzle means to control the machine as desired,
    wherein said control device is detachably connectable to the machine and is powered by 24 V direct current, said nozzle means (4) is connected to an input of an interface member (7) and wire means interconnects, via an adapter, an output of said interface member with an input of motor control means of the machine, said wire means supplies control device signals to and from said motor control means, and said nozzle means (4) controls medium flow to said interface member and causes pressure variation of said control device which is converted into a code for controlling operation of the machine, and medium flow through said nozzle means in a first direction controls at least a first function or series of functions of the machine and medium flow through said nozzle means in a second direction controls at least a second function or series of functions of the machine.

12. A functional control device according to claim 11 is used to control a sewing machine, wherein said first series of functions control downward movement of a presser foot as well as motor speed and said second series of functions control upward movement of said presser foot as well as a cutting and locking operation.

13. A functional control device according to claim 12, wherein said interface member comprises pressure and electric interfaces for said control device, said pressure and electric interfaces are readily changeable to facilitate control of various types of machine control means and different pressure sensitivities.

14. A functional control device according to claim 11, wherein means are provided to vary signals sent to said motor control means.

15. A functional control device according to claim 11, wherein said nozzle means (4) is connected to an inlet of the input of the interface member (7) by a single hose pipe (5), and a second inlet of the input is one of plugged and left open to communicate with the ambient air.

16. A functional control device according to claim 11, wherein said nozzle means (4) actuates a piezo-electric sensor (8) of said interface member (7) which generates an analogous output signal which is amplified by a first amplifier (9 and 17 respectively).

17. A functional control device according to claim 16, wherein said analogous output signal is fed to an analog/digital converter (10) and an output signal therefrom is fed to a memory (11) where the inputted signal is converted to a control code for controlling said motor control means, and the code is fed to an output signal amplifier (12) which varies the voltage level for said motor control means according to the code.

18. A functional control device according to claim 16, wherein said analogous output signal from said first amplifier (9 and 17) is divided into two signals and simultaneously fed to a second amplifier (18) and a converter (19), said second amplifier (18) adjusts said analogous output signal to a signal required for said motor control means for controlling motor speed and said converter (19) controls at least one of starting, stopping, presser foot lifting and lowering, and thread cutting.

19. A functional control device according to claim 11, wherein said interface member (7) receives its electric power from said motor control means which is powered by a reduced 24 V direct current.

20. A functional control device according to claim 19, wherein electric power from said motor control means is supplied to said interface member (7) through one of an electric wire (16) having a built-in connector (15) and a conductor of said wire means (13).

* * * * *